United States Patent
Kim et al.

(10) Patent No.: US 8,669,342 B2
(45) Date of Patent: Mar. 11, 2014

(54) NON-PAINTING AND HIGH-GLOSS POLYCARBONATE RESIN COMPOSITION

(71) Applicants: Hyundai Motor Company, Seoul (KR); Kia Motors Corporation, Seoul (KR); LG Chem. Ltd., Seoul (KR)

(72) Inventors: Dae Sik Kim, Gyeonggi-do (KR); Jung Gyun Noh, Gyeonggi-do (KR); Kyeong Hoon Jang, Seoul (KR); Hyun Joon Choi, Seoul (KR); Yong Kim, Daejeon (KR); Sung Tae Ahn, Daejeon (KR); Min Han Kwak, Gyeonggi-do (KR)

(73) Assignees: Hyundai Motor Company, Seoul (KR); Kia Motors Corporation, Seoul (KR); LG Chem. Ltd., Seoul (KR)

( * ) Notice: Subject to any disclaimer, the term of this patent is extended or adjusted under 35 U.S.C. 154(b) by 0 days.

(21) Appl. No.: 13/712,228

(22) Filed: Dec. 12, 2012

(65) Prior Publication Data

US 2014/0045968 A1 Feb. 13, 2014

(30) Foreign Application Priority Data

Aug. 7, 2012 (KR) .......................... 10-2012-0086325

(51) Int. Cl.
*C08G 64/00* (2006.01)
*C08G 63/02* (2006.01)

(52) U.S. Cl.
USPC ......................................... 528/196; 528/198

(58) Field of Classification Search
USPC .................................................. 528/196, 198
See application file for complete search history.

(56) References Cited

U.S. PATENT DOCUMENTS

2011/0160380 A1* 6/2011 Kwon et al. .................. 524/508

FOREIGN PATENT DOCUMENTS

| JP | 08199055 A | 8/1996 |
|---|---|---|
| JP | 2002114902 A | 4/2002 |
| JP | 2002114903 A | 4/2002 |
| JP | 2011168705 A | 9/2011 |
| KR | 10-0802752 | 2/2008 |
| KR | 10-2009-0052447 | 5/2009 |
| KR | 10-0937820 | 1/2010 |

* cited by examiner

*Primary Examiner* — Terressa Boykin
(74) *Attorney, Agent, or Firm* — Edwards Wildman Palmer LLP; Peter F. Corless

(57) ABSTRACT

The invention provides a non-painting and high-gloss polycarbonate resin composition. Specifically, the invention provides a polycarbonate resin composition having a superior impact strength, heat-resistance, electric characteristics, weather resistance, and light resistance. In certain embodiments, the resin composition of the invention is obtained by mixing a butadiene-based impact modifier, such as acrylonitrile-butadiene-styrene (ABS) or methacrylate-butadiene-styrene and an acryl-based impact modifier in polycarbonate resin, followed by adding an ultraviolet (UV) absorbent to the mixture.

8 Claims, No Drawings

NON-PAINTING AND HIGH-GLOSS POLYCARBONATE RESIN COMPOSITION

CROSS-REFERENCE TO RELATED APPLICATION

This application claims under 35 U.S.C. §119(a) the benefit of Korean Patent Application No. 10-2012-0086325 filed on Aug. 7, 2012, the entire contents of which are incorporated herein by reference.

BACKGROUND (a) Technical Field

The invention provides a non-painting and high-gloss polycarbonate resin composition. In certain embodiments, the invention provides a polycarbonate resin composition having superior impact strength, heat-resistance, electric characteristics, weather resistance, and light resistance. The resin composition is obtained by mixing a butadiene-based impact modifier (such as, acrylonitrile-butadiene-styrene (ABS), and methacrylate-butadiene-styrene) and an acryl-based impact modifier in polycarbonate resin to obtain a mixture, followed by adding an ultraviolet (UV) absorbent to the mixture.

(b) Background Art

As an engineering plastic material for interior and exterior uses in vehicles and housings of office equipment is continuously exposed to a light source, such as, ultraviolet (UV) rays, light resistance or weather resistance of the engineering plastic material is desired to prevent aging of the plastic materials caused by the UV rays. The materials need high temperature heat-resistance so that they would not be deformed at a temperature as high as 110° C. Consequently, the material can stand hot weather in outdoor environments under sunlight during the summertime. It is also desired that the material has low-temperature brittleness, so that its strength is not minimized at an extremely low temperature during the wintertime. The materials also need a high flow index to make it possible for a complex injection molding by using a mold, as well as a high tensile strength to a stand flow stress that is applied during use.

However, physical properties, such as, low-temperature brittleness, tensile strength, fluidity, heat resistance, and light resistance, generally tend to be inversely proportional to one another. Thus, it is difficult to manufacture a product which satisfies all the needs of consumers needs, as it is almost impossible to make a resin having various characteristics at the same time. Accordingly, when different resins having different characteristics are properly mixed for molding, schemes capable of providing new characteristics, that is, a characteristic which has not been provided by the resins, and in the meantime capable of maintaining the characteristics and advantages of the resins, have been contemplated. However, the adhesive strength between the resins is deteriorated through a simple mixing of the resins, failing to show new synergistic effects. Further, only the characteristics through a simple mixing are provided; or, the characteristics could even degrade.

To develop a resin composition having various physical properties, first, it is important to develop products which contain polycarbonate resin having a high heat resistance, dimensional stability, and tensile strength as the main resin. Polycarbonate is an engineering plastic resin that has transparency, a high-gloss feature, and high strength. When it is blended with an impact modifier, it minimizes certain disadvantages, such as, moldability, the relationship between impact and thickness, the anti-chemical property, and so forth.

Next, it is desirable to develop a resin having a superior thermal stability, impact resistance, self-extinguishing property (such as, that of polycarbonate), processibility, and an economical efficiency. Acrylonitrile-butadiene-styrene, a polycarbonate/styrene-based resin, particularly, acrylonitrile-butadiene-styrene alloy, has been developed as an engineering plastic material, which has been increasingly used as interior and exterior materials of vehicles and housings of office equipment. However, a combination of polycarbonate and acrylonitrile-butadiene-styrene alloy resin can be easily discolored by lights due to the poor light resistance that acrylonitrile-butadiene-styrene has. Therefore, the use of the combination of polycarbonate and acrylonitrile-butadiene-styrene as a structure is limited, unless the structure is painted or coated with a pad to prevent discoloring.

For the above concerns, various methods for improving the light resistance of a polycarbonate resin composition have been developed, for example, those provided in Korean Patent No. 802752, Japanese Patent Application Publication No. Hei 8-0199055, Japanese Patent Application Publication No. 2002-0114903, and Japanese Patent Application Publication No. 2002-0114902. However, the techniques described in these references fail to provide a method of manufacturing a molding product having low-temperature brittleness, tensile strength, fluidity, heat resistance, and light resistance, and etc. Generally, when the weather resistance is improved by adding a weather-resistance resin, such as acrylonitrile-styrene-acrylate resin, the low-temperature brittleness of the acrylonitrile-styrene-acrylate resin is reduced, compared to that of the acrylonitrile-butadiene-styrene resin, thus degrading the low-temperature impact strength of the resin. On the other hand, despite that low-temperature brittleness may be reinforced by adding a silicon-based impact modifier, there is a limitation in reinforcing the low-temperature brittleness while maintaining the light resistance.

Therefore, there is an urgent need for development of a material having superior light resistance while maintaining all of the main characteristics of a polycarbonate/acrylonitrile-butadiene-styrene alloy, such as, impact resistance, moldability, dimensional stability, and stiffness.

SUMMARY OF THE DISCLOSURE

To achieve the above purpose, the present inventors of the invention developed a material having a superior light resistance while maintaining all of the main characteristics of a polycarbonate/acrylonitrile-butadiene-styrene alloy, such as, impact resistance, moldability, dimensional stability, and stiffness. Specifically, the inventors discovered a material that has a superior light resistance and maintains all of the main characteristics of a polycarbonate/acrylonitrile-butadiene-styrene alloy, such as, impact resistance, moldability, dimensional stability, and stiffness. The material of the invention is produced by a method comprising mixing styrene acrylonitrile, a butadiene-based impact modifier, and an acryl-based impact modifier having superior weather resistance in a polycarbonate resin at an optimal ratio to obtain a mixture, and adding an ultraviolet (UV) absorbent to the mixture.

Accordingly, the invention provides a polycarbonate resin composition having a good combination of an excellent light resistance and physical properties.

An aspect of the invention provides a polycarbonate resin composition including 65-85 wt % of polycarbonate having a melt index of 2-30 g/10 minutes (300° C., 1.2 kg), 2-6 wt % of a butadiene-based impact modifier, 4-15 wt % of an acryl-based impact modifier, 5-25 wt % of styrene acrylonitrile, and 0.1-0.8 wt % of an ultraviolet (UV) absorbent.

Other aspects and embodiments of the invention are discussed infra.

DETAILED DESCRIPTION

Hereinafter, an exemplary embodiment of the invention will be described in detail to allow those of ordinary skill in the art to easily carry out the invention. While the invention will be described in conjunction with the exemplary embodiment, it will be understood that present description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

The invention will be described with an exemplary embodiment thereof.

The polycarbonate used in the invention has a melt index of 2-30 g/10 minutes (300° C., 1.2 kg). If the melt index is less than 2 g/10 minutes, moldability is deteriorated, making it impossible to mold a complex structure. On the other hand, if a melt index is 30 g/10 minutes or more, the physical properties of polycarbonate are degraded due to a low molecular weight of polycarbonate, reducing mechanical properties of a resin composition. The polycarbonate is used in the amount of 65-85 wt %, preferably 70-80 wt % with respect to the total weight of the polycarbonate resin composition. If the content is less than 65 wt %, the low-temperature impact strength is deteriorated. In contrast, if the content is higher than 85 wt %, the moldability and strength of resin are impaired.

A butadiene-based impact modifier and an acryl-based impact modifier used in the invention improve the impact resistance by dispersing and absorbing an external impact on a polycarbonate resin composition. The butadiene-based impact modifier means a resin in which a main component of the impact modifier is butadiene rubber, such as, acrylonitrile-butadiene-styrene (ABS) and methacrylate-butadiene-styrene. Compared to an acryl-based impact modifier, the butadiene-based impact modifier has a poorer weather resistance, but a much better impact resistance. The composition according to the invention is reinforced with the acryl-based impact modifier that has a superior weather resistance but poor low-temperature brittleness. The poor low-temperature brittleness is remedied by an addition of a butadiene-based impact modifier at a level which does not significantly deteriorate the light resistance.

The butadiene impact modifier is present in the amount of 2-6 wt % with respect to the total weight of the composition. If the amount is 2 wt % or less, there is no sufficient impact modification effect. In contrast, if the amount is higher than 6 wt %, the light resistance of a resin composition is deteriorated.

In certain embodiments, the acryl-based impact modifier is present in the amount of 4-15 wt % with respect to the total composition. If its amount is less than 4 wt %, there is no sufficient impact modification effect. On the other hand, if its amount is higher than 15 wt %, strength will be deteriorated. Examples of the butadiene-based impact modifier according to the invention may include, but not limited to, a copolymer grafted with a styrene-based aromatic vinyl compound, an acrylonitrile-based cyanide vinyl compound, and butadiene rubber; a copolymer grafted with a styrene-based aromatic vinyl compound, an acrylonitrile-based cyanide vinyl compound, and methacrylate; and equivalents thereof.

Examples of the acryl-based impact modifier according to the invention may include, but not limited to, a copolymer grafted with a styrene-based aromatic vinyl compound and an acrylonitrile-based cyanide vinyl compound and equivalents thereof.

The styrene acrylonitrile used in the invention gives stiffness to a resin composition, and is present in the amount of 5-25 wt %, and preferably 8-15 wt % with respect to the total weight of the polycarbonate resin composition. If its amount is less than 5 wt % or less, the stiffness is insufficient. In contrast, if its amount is more than 25 wt %, the impact resistance is deteriorated. Consequently, the resin composition cannot be used in various products.

Generally, an UV absorbent absorbs UV rays, a deterioration initiating factor of plastic, thereby improving plastic's weather resistance. Conventionally, a pindideamine-based UV stabilizer (HALS) has been used to stabilize plastic by efficiently replacing harmful free radicals generated by UV energy in spite of a low UV absorption rate. A plastic resin using the UV stabilizer shows excellent light resistance, but is not suitable for the intended purposes in terms of physical properties and economic efficiency.

The invention employs a UV absorbent which absorbs UV rays having a wavelength of 290-400 nm, has superior absorption efficiency, converts the absorbed UV rays into harmless thermal energy, disperses the thermal energy, and is also stable under light. In particular, the invention uses a hydroxybenzotriazole-based UV absorbent. When the hydroxybenzotriazole-based UV absorbent is added to an organic high-polymer compound, it selectively absorbs the UV rays and converts the UV rays into harmless thermal energy, slowing the aging of the composition and reducing the degradation of its mechanical physical property. In particular, when the UV absorbent is added to a composition including poly vinyl chloride (PVC), styrene-based, polyester-based, and acryl-based polymers, polyurethane, polycarbonate, polyvinylidene chloride (PVDC), and cellulose ester, it can achieve superior effects. Efforts needed to be taken to prevent it from discoloring because the UV absorbent forms a complex salt under metallic ions, especially an alkylic substance. The UV absorbent is present preferably in the amount of 0.1-0.8 wt % with respect to the total weight of the composition. If the amount of the UV absorbent is less than 0.1 wt %, a sufficient light resistance cannot be obtained. In contrast, if the amount of the UV absorbent is higher than 0.8 wt %, the mechanical physical properties of the resin composition are deteriorated and excessive gas is generated, thereby deteriorating the exterior of a molded product.

Examples of the UV absorbent according to the invention includes, but not limited to, benzotriazole, benzotriazine, and equivalents thereof.

According to the invention, in addition to the above components, additives such as an antioxidant, a lubricant, a silicon agent, a release agent, a pigment, an antistatic agent, an anti-microbial agent, a processing agent, an anti-friction/abrasion agent, and so forth may be properly added.

To mix the composition, existing methods used in this field may be used, for example, heating-melting-mixing after dry-blending may be adopted. The mixing temperature is generally from 230-270° C., or preferably 240-260° C., so that the mixing is performed in such a way that components can maintain sufficient affinity physically and chemically. If the mixing temperature is lower than 230° C., the resin composition is not melted such that mixing is not possible; for a mixing temperature of 270° C. or higher, the physical properties of the product are degraded due to an excessive resin decomposition.

Physical property evaluation of the following example and comparative examples was performed in accordance with the following test method:

1) Melt Flow Index (MFI): the evaluation was executed based on ASTM D1238 (250° C., 2.16 kg);
2) Tensile Strength: the evaluation was executed based on ASTM D 638 (test piece's thickness of 3.2 mm, 23° C.);
3) Flexural Strength: the evaluation was executed based on ASTM D 790 (test piece's thickness of 3.2 mm, 23° C.);
4) Flexural Modulus: the evaluation was executed based on ASTM D 790 (test piece's thickness of 3.2 mm, 23° C.);
5) Impact Strength: the evaluation was executed based on ASTM D 256 (test piece's thickness of 3.2 mm, −30° C.); and
6) Light Resistance: an injection test piece of 10×10×3 mm was manufactured and exposed to UV rays using a light-resistance tester from Atlas Co., Ltd., after which the exterior was evaluated by the naked eye.

Example 1

Components were melted and blended/mixed at 250° C. by using a twin-screw extruder. The content of each component for manufacturing a pallet is shown in Table 1. Test pieces for measuring physical properties were manufactured by using an injector. Each test piece was then tested by the foregoing test method. The test results were shown in Table 2.

Comparative Examples 1-5

The process was performed in the same manner as Example 1. The components were blended/mixed as shown in Table 1. Test pieces for measuring physical properties were manufactured by using an injector. And, each test piece was tested by the foregoing test method. The test results were shown in Table 2.

It can be seen in Example 1 and Comparative Examples 3-5 that, when the content of an acryl-based and butadiene-based impact modifier decreases, the low-temperature impact strength is impaired. In contrast, when the content of an acryl-based impact modifier decreases, fluidity and strength are deteriorated.

It can be seen in Example 1 and Comparative Example 6 that when the content of a butadiene-based impact modifier is higher than a predetermined level, the low-temperature impact strength is reinforced and the physical property balance is maintained, but the light resistance is sharply deteriorated. Therefore, to obtain a resin that has superior mechanical properties, such as, a melt flow index, tensile strength, flexural strength, flexural modulus, and izod strength, and excellent light resistance, it is desirable to use an optimal composition ratio as provided herein.

As described above, the polycarbonate resin composition according to the invention provides superior light resistance while maintaining an excellent mechanical performance. It is applicable for non-painting uses of a product which needs light resistance as well as superior mechanical physical properties. Specifically, the polycarbonate resin composition according to the invention can be used as exterior and interior materials of vehicles, housings of office equipment, or lamp housings, which are continuously exposed to light sources.

While an exemplary embodiment of the invention has been described in detail, the protection scope of the present invention is not limited to the foregoing embodiment and it will be appreciated by those skilled in the art that various modifications and improvements using the basic concept of the invention defined in the appended claims are also included in the protection scope of the present invention.

TABLE 1

| Component (wt %) | Ex. 1 | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- | --- |
| PC | 74 | 90 | 60 | 74 | 73 | 74 | 70 |
| (A-1) + (A-2) | 4 | 3 | 5 | 4 | 4 | 1 | 8 |
| B | 7 | 4 | 10 | 2 | 17 | 12 | 3 |
| C | 14.4 | 3 | 24.9 | 19.4 | 6 | 12.6 | 14.4 |
| D | 0.6 | | | | | 0.4 | 0.6 |

TABLE 2

| Item | | Ex. 1 | Comp. Ex. 1 | Comp. Ex. 2 | Comp. Ex. 3 | Comp. Ex. 4 | Comp. Ex. 5 | Comp. Ex. 6 |
| --- | --- | --- | --- | --- | --- | --- | --- | --- |
| Melt Flow Index | | 4.2 | 1.2 | 7.5 | 6.2 | 2.5 | 4.6 | 3.8 |
| Tensile Strength | | 540 | 510 | 580 | 560 | 480 | 550 | 520 |
| Flexural Strength | | 880 | 830 | 940 | 900 | 740 | 890 | 850 |
| Flexural Modulus | | 22500 | 21000 | 24500 | 23500 | 19000 | 22800 | 21500 |
| Izod Strength | 23 | 73 | 78 | 62 | 55 | 75 | 70 | 76 |
| | −30 | 45 | 55 | 13 | 11 | 57 | 15 | 55 |
| Light Resistance (E*) | | 2.5 | 6.3 | 9.5 | 8.7 | 7.5 | 2.4 | 4.9 |

It can be seen in Example 1 and Comparative Examples 1 and 2 of Table 2 that the increase in the content of polycarbonate improves the impact strength, but it deteriorates fluidity, which causes problems in product processing. As the content of polycarbonate decreases, fluidity and strength are improved, but the low-temperature impact strength is sharply reduced.

DESCRIPTION OF REFERENCE NUMERALS

Symbols in the example and the comparative examples have the following meanings:

1. Polycarbonate (PC): a melt index of 10 g/10 minutes (ASTM D1238, 300° C., 1.2 Kgf);

2. Butadiene-based impact modifier (A-1): butadiene content is 60%, LG dry powder;

3. Butadiene-based impact modifier (A-2): an impact modifier in which butadiene and acrylate form a core shell structure (LG EM-500);

4. Acryl-based impact modifier (B): an impact modifier in which butylacrylate and styreneacrylate form a core shell structure (GA 0306);

5. Styrene acrylonitrile (C): styrene acrylonitrile (SAN, LG SAN81 HF); and

6. UV absorbent (D) (Ciba, Tinuvin 329)

What is claimed is:

1. A polycarbonate resin composition comprising:
about 65-85 wt % of polycarbonate having a melt index of 2-30 g/10 minutes (300° C., 1.2 kg);
about 2-6 wt % of a butadiene-based impact modifier;
about 4-15 wt % of an acryl-based impact modifier;
about 5-25 wt % of styrene acrylonitrile; and
about 0.1-0.8 wt % of an ultraviolet (UV) absorbent,
wherein the acryl-based impact modifier is a copolymer grafted with a styrene-based aromatic vinyl compound and an acrylonitrile-based cyanide vinyl compound, and
wherein the UV absorbent is a hydroxybenzotriazole-based UV absorbent.

2. The polycarbonate resin composition of claim 1, wherein the butadiene-based impact modifier comprises a copolymer grafted with components selected from a styrene-based aromatic vinyl compound, an acrylonitrile-based cyanide vinyl compound, and butadiene rubber, or a copolymer grafted with components selected from a styrene-based aromatic vinyl compound, an acrylonitrile-based cyanide vinyl compound, and methacrylate.

3. The polycarbonate resin composition of claim 1, wherein the UV absorbent comprises benzotriazole.

4. The polycarbonate resin composition of claim 1, wherein the UV absorbent comprises benzotriazine.

5. The polycarbonate resin composition of claim 1, further comprising one or more additives selected from among the group consisting of an antioxidant, a lubricant, a silicon agent, a release agent, a pigment, an antistatic agent, an anti-microbial agent, a processing agent, and an anti-friction/abrasion agent.

6. The polycarbonate resin composition of claim 2, further comprising one or more additives selected from among the group consisting of an antioxidant, a lubricant, a silicon agent, a release agent, a pigment, an antistatic agent, an anti-microbial agent, a processing agent, and an anti-friction/abrasion agent.

7. The polycarbonate resin composition of claim 3, further comprising one or more additives selected from among the group consisting of an antioxidant, a lubricant, a silicon agent, a release agent, a pigment, an antistatic agent, an anti-microbial agent, a processing agent, and an anti-friction/abrasion agent.

8. The polycarbonate resin composition of claim 4, further comprising one or more additives selected from among the group consisting of an antioxidant, a lubricant, a silicon agent, a release agent, a pigment, an antistatic agent, an anti-microbial agent, a processing agent, and an anti-friction/abrasion agent.

* * * * *